Oct. 27, 1925.
H. LEITNER
SCREW PROPELLER
Original Filed Oct. 20, 1923    2 Sheets-Sheet 2
1,559,173
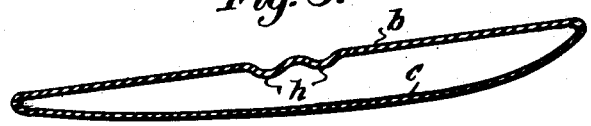
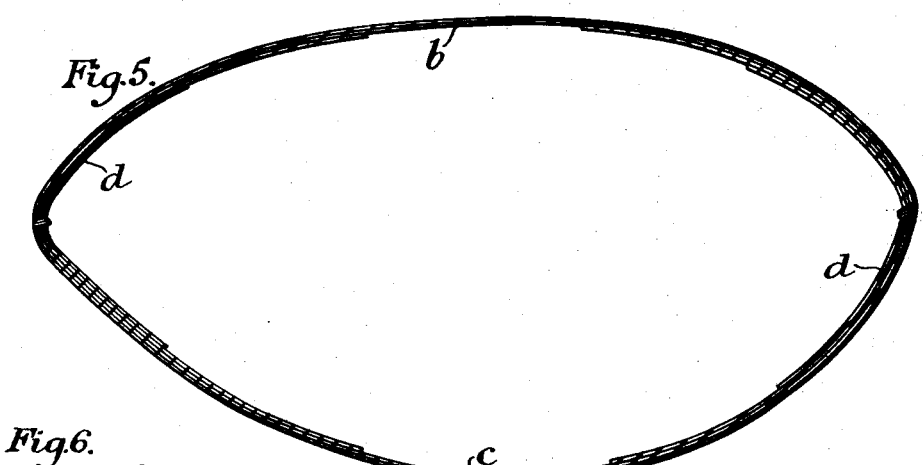
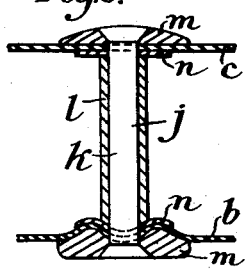
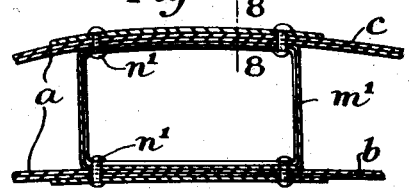
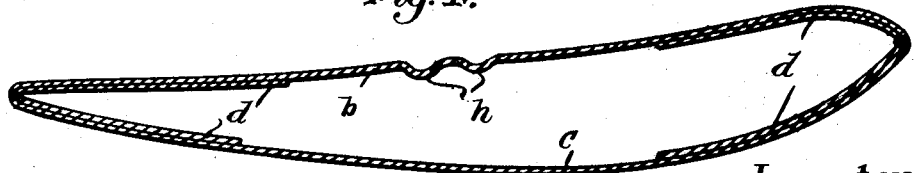
Inventor.
Henry Leitner
By George A. Prevost
Atty.

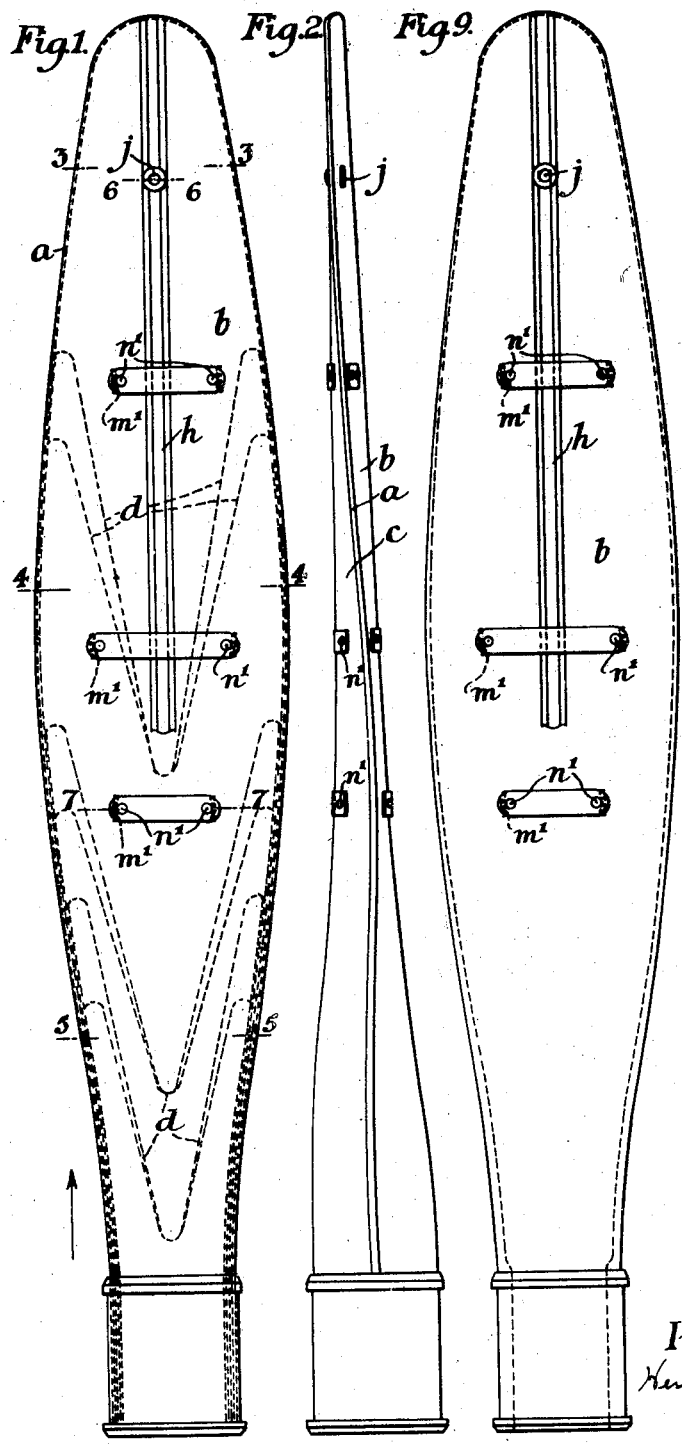

Patented Oct. 27, 1925.

1,559,173

UNITED STATES PATENT OFFICE.

HENRY LEITNER, OF LONDON, ENGLAND.

SCREW PROPELLER.

Original application filed October 20, 1923, Serial No. 669,750. Divided and this application filed July 17, 1924. Serial No. 726,597.

*To all whom it may concern:*

Be it known that I, HENRY LEITNER, a subject of the King of Great Britain, residing at Regent House, Kingsway, London, England, have invented new and useful Improvements in Screw Propellers, of which the following is a specification.

My invention relates to detachable metal blades mainly for airscrews and to the type of propeller having hollow blades composed of metal plates either in taper gauge or laminated, attached along their edges by welding, brazing or the like, as in my copending application Ser. No. 669,750 of which this application is a division.

In constructing propellers of this type it is found in practice that, during the welding and normalizing operations, distortion of the metal takes place, with considerable difficulties in reshaping to correct dimensions. In the specification of my British Patent No. 167,120 I have described a method of dealing with these difficulties which consists in forming a slit in the face or back plate of the blade, or in each plate, such slit being, in some cases, covered by a metal strip or strips. The metal of the blades is thereby free to expand and contract under the aforesaid manufacturing operations so that no great distortion results, or that cannot be readily dealt with.

This method, whilst it gives excellent results in practice, entails certain disadvantages in manufacture which it is the object of my present invention to obviate.

According to my present invention, in lieu of the slit described in the specification of my aforesaid British Patent No. 167,120, I form either the face or the back plate, or each plate, of the propeller blade with one or more longitudinal corrugations obtained by rolling or pressing, and serving the double purpose of stiffening the blade and of minimizing the distortions above referred to, and enabling such as occur to be satisfactorily rectified by utilizing the surplus metal provided by the corrugation or corrugations.

To enable the invention to be fully understood I will describe it by reference to the accompanying drawing, in which:—

Figure 1 is an elevation of a laminated propeller blade constructed in accordance with my invention, and Figure 2 is a view at right angles to Figure 1.

Figures 3, 4 and 5 are sections taken, respectively, on the lines 3—3, 4—4 and 5—5, Figure 1, looking in the direction of the arrow, but drawn to a larger scale than the said latter figure.

Figure 6 is an enlarged section on the line 6—6, Figure 1, illustrating a form of strut between the sides of the blade.

Figure 7 is a section on the line 7—7, Figure 1, illustrating a modified form of strut and Figure 8 is a section on the line 8—8, Figure 7.

Figure 9 is a view similar to Figure 1, but with the blade made of plates of taper gauge.

$a$ is the hollow sheet metal propeller blade detachable from and adjustable in the hub (not shown) as to pitch and made in halves which constitute the pressure and suction faces $b$, $c$, respectively, the said faces being formed of separate plates, the edges of which, when welded or otherwise joined together, form the edges of the blade.

In order that the strength of the blade shall be uniform throughout, the halves thereof are made thinner at the tip than at the root. In the construction illustrated in Figures 1 to 8, the blade for this purpose is built up, in addition to the plates forming the faces $b$ and $c$, of a series of interior plates $d$ of different lengths, whilst in the construction illustrated in Figure 9, the blade is built up of two plates only, of curved taper form and constituting the two faces $b$, $c$ respectively, both forms of blades having the faces concaved for part of their length. Or, the plates instead of being of parallel gauge, may be made of taper gauge.

$h$, indicates the longitudinal corrugations which I form in the face (or back) of the blade to minimize distortion due to welding and normalizing, the said corrugations being formed to project inwardly so as not to form an obstruction to the movement of the blade through the air or other medium. These corrugations also assist to stiffen the blade.

The corrugations $h$ may be supplemented by ties $j$, Figures 1, 6 and 9, which are also constructed to resist compression to prevent collapsing of the blade faces. Each of these ties comprises a rivet $k$ passing through both faces of the blade and having a tube $l$ threaded on it, washers $m$, $n$ being arranged, respectively, between the heads of the rivet and the outer surface of the blade face and between the inner surfaces of the latter and the ends of the tube.

Instead of the tie just described, I may employ the form of tie illustrated in Figures 7 and 8, which is shown applied to the propeller blades illustrated in Figures 1, 2 and 9 at three points and comprising a band or box $m^1$ with open ends, and two opposite sides in contact with the plates forming the faces $b$, $c$ of the blade and secured thereto by rivets $n^1$; or, it may be fixed to the said plates by brazing or welding.

The ties $j$ and $m^1$ are similar to those described and illustrated in the complete specification of my cognate British applications Nos. 7,731 and 15,065, both of 1923, and no claim per se is made thereto in this application.

Having now particularly described and ascertained the nature of my said invention and in what manner the same is to be performed, I declare that what I claim is:—

1. A screw-propeller of the type hereinbefore referred to, wherein the face or back plate of each plate of each blade is formed with one or more longitudinal corrugations substantially as, and for the purpose, specified.

2. A screw-propeller as claimed in claim 1, wherein the corrugations project within the blades so as not to form an obstruction to the movement of the latter through the air or other medium.

HENRY LEITNER.